United States Patent [19]

Vogelgesang

[11] Patent Number: 5,340,975
[45] Date of Patent: Aug. 23, 1994

[54] METHOD AND APPARATUS FOR REDUCING THE EFFECTS OF LASER NOISE AND FOR IMPROVING MODULATION TRANSFER FUNCTION IN SCANNING A PHOTOCONDUCTIVE SURFACE

[75] Inventor: Peter J. Vogelgesang, St. Paul, Minn.

[73] Assignee: Minnesota Mining and Manufacturing Company, St. Paul, Minn.

[21] Appl. No.: 11,332

[22] Filed: Jan. 29, 1993

[51] Int. Cl.⁵ .............................................. G01J 1/32
[52] U.S. Cl. ................................ 250/205; 219/121.62
[58] Field of Search ............... 250/205, 214 A, 214 R, 250/234, 235, 236, 370.09, 327.2, 226; 307/311; 219/121.61, 121.62

[56] References Cited

U.S. PATENT DOCUMENTS

| | | | |
|---|---|---|---|
| 4,028,732 | 6/1977 | Salter et al. | 358/289 |
| 4,400,740 | 8/1983 | Traino et al. | 358/293 |
| 4,583,128 | 4/1986 | Anderson, Jr. et al. | |
| 4,663,526 | 5/1987 | Kamieniecki | 250/327.2 |
| 4,839,493 | 6/1989 | Herziger et al. | 219/121.62 |
| 4,865,683 | 9/1989 | Burns | 219/121.61 |
| 4,954,706 | 9/1990 | Takahashi et al. | 250/214 LA |
| 5,149,953 | 9/1992 | Erwin | 250/205 |
| 5,171,965 | 12/1992 | Suzuki et al. | 219/121.62 |

FOREIGN PATENT DOCUMENTS

0218449A2  4/1987  European Pat. Off. ...... H01S 3/133

OTHER PUBLICATIONS

"Generation of Precision Pixel Clock in Laser Printers and Scanners", Gerald Toyan, SPIE vol. 84, Laser Scanning Components and Techniques (1978), pp. 138–145.

*Primary Examiner*—David C. Nelms
*Assistant Examiner*—K. Shami
*Attorney, Agent, or Firm*—Gary L. Griswold; Walter N. Kirn; William D. Bauer

[57] ABSTRACT

A method and an apparatus is provided for reducing the effects of laser noise and for improving modulation transfer function in scanning a surface of a photoconductive plate with a spot of light through use of a time-light intensity integration method. The method comprises pulse synchronization or infrared synchronization to control activation and deactivation of signal detection laser light beams.

5 Claims, 5 Drawing Sheets

METHOD AND APPARATUS FOR REDUCING THE EFFECTS OF LASER NOISE AND FOR IMPROVING MODULATION TRANSFER FUNCTION IN SCANNING A PHOTOCONDUCTIVE SURFACE

FIELD OF THE INVENTION

This invention relates to a method for controlling the intensity of a light source scanning a photoconductive surface. In addition, the invention relates to a method of synchronizing the activation of a photoactive light source with a formatted pattern on the surface of a photoconductive medium.

BACKGROUND OF THE INVENTION

During scanning of a photoconductive surface, such as an x-ray plate, with a focused laser beam, an electrical signal is generated which represents an image. Variations in laser light intensity during scanning introduce errors in the measured signal and in the density of the reproduced image. These variations in laser light intensity are known collectively as laser noise. Laser noise, manifested as variations of light output intensity with time, is a characteristic of both gas and semiconductive lasers. This laser noise, and other signal errors, cause the modulation transfer function of the system to be degraded.

SUMMARY OF THE INVENTION

A method is provided for reducing the effects of laser noise and for improving modulation transfer function when scanning a photoconductive surface with a spot of light. The method comprises providing a laser light source for directing a first light beam onto a photoconductive surface, and for directing a second light beam to a photodetector. A second step comprises generating, using the photodetector, a current which is proportional to the instantaneous light intensity of the first light beam. Then, the generated current is applied to an integrator to produce an output voltage proportional to the time-light intensity integral of the first light beam. Next, the output voltage is fed to a voltage comparator to compare the output voltage with a pre-set voltage to create an output signal. A final step comprises passing the output signal through modulation means for controlling the operation of the laser light source. The modulation means is responsive to the output signal of the voltage comparator so that when the value of pre-set voltage in the comparator is exceeded then the modulation means prevents useful transmission of the laser light past the modulation means.

A system is provided which reduces the effects of laser noise and which improves the modulation transfer function in scanning a photoconductive surface with a spot of light. The system comprises a light source for directing a first light beam onto a photoconductive surface and for directing a second light beam to a photodetector. The photodetector generates a current which is proportional to the instantaneous light intensity of the first light beam. An integrator receives the current from the photodetector and produces an output voltage that is proportional to the time-light intensity integral of the first light beam. Comparator means is provided for comparing the output voltage with a pre-set voltage to create an output signal. A modulator is controlled by the comparator means output signal so that when the value of pre-set voltage in the comparator is exceeded the modulator prevents useful transmission of light from the light source past the modulator.

DETAILED DESCRIPTION OF THE INVENTION

Figure 1:
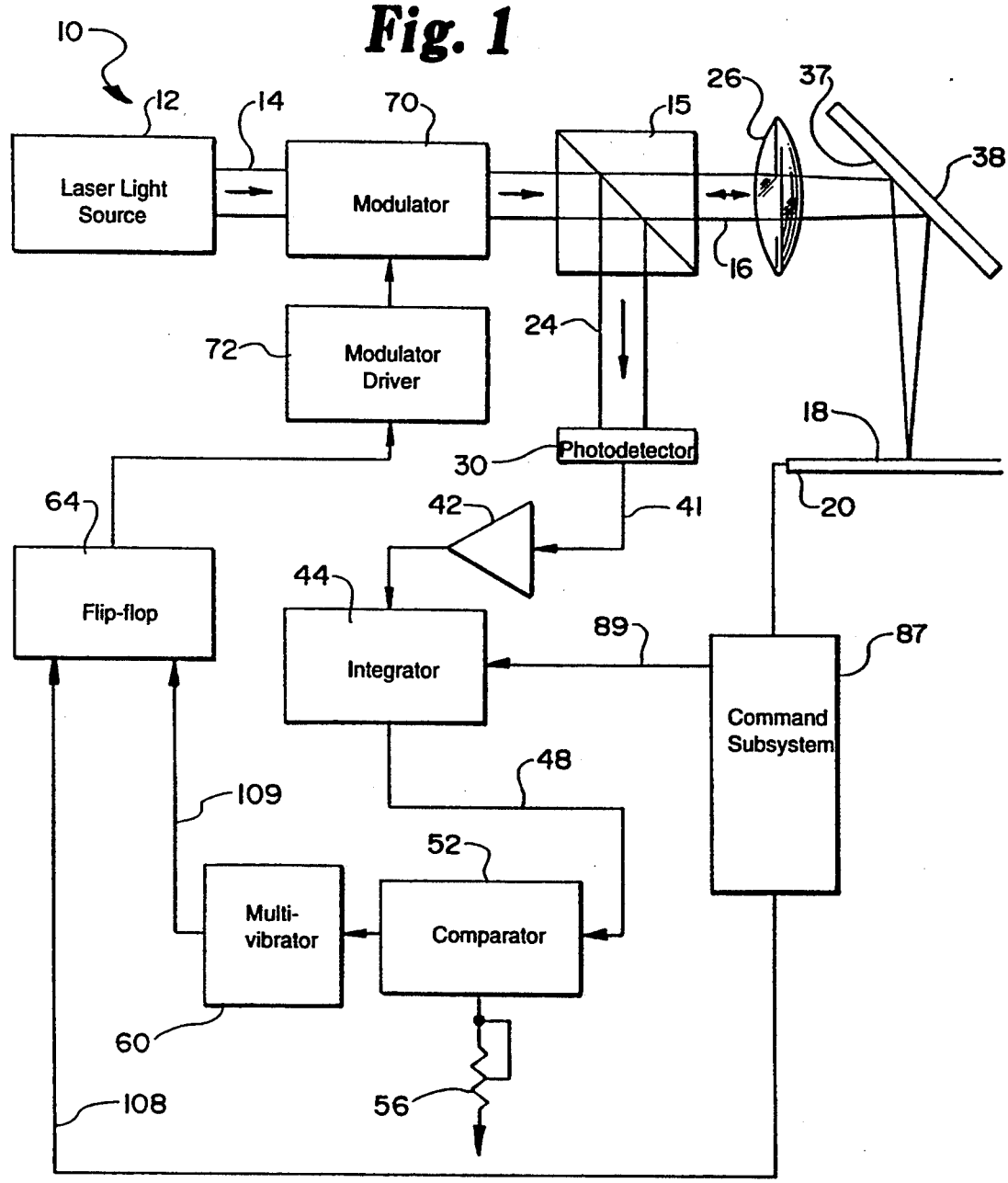
FIG. 1 is a block diagram of a system for scanning a photoconductive plate comprising a time-light intensity integration feature.

During scanning of a photoconductive plate, such as a thick film selenium x-ray plate, with a focused laser beam, problems arise which relate to generated laser noise. The laser noise introduce errors into measured signals. The generated laser noise is an internal and intrinsic characteristic of all laser light sources. Therefore, as disclosed in a first embodiment in FIG. 1, a scanning system 10 discloses components and methods for modulating a laser beam to reduce the laser noise. Additionally, the modulation transfer function (MTF) of the scanning system is improved by virtue of the focused laser beam being applied to the photoconductive plate in short time intervals in which the beam does not move appreciably during the exposure of successive image pixels.

A laser light source 12 provides an output laser light beam 14 through a beam splitter 15 for providing a first beam 16. First light beam 16 then passes through objective lens 26 and into contact with mirror 37 within scanning mechanism 38. Scanning mechanism 38 causes first light beam 16 to be exposed and directed onto surface 18 of photoconductive plate 20, and then scanned across one axis of the plate.

Laser light beam 14 is also split into a second light beam 24 which is directed to a photodetector 30. Photodetector 30 generates a current that is proportional to the instantaneous light output level or intensity of laser light source 12. Photodetector output current 41 passes through amplifier 42 and is applied to integrator 44. Integrator 44 produces an output voltage signal 48 that is proportional to the time-light or time-intensity integral of laser light source 12. Voltage 48 is then fed to a voltage comparator 52, or threshold detector, which compares the time-light integral with a pre-set voltage representing the desired level of exposure. An exposure control sub-circuit 56 provides this function. When the time-light integral exceeds the pre-set voltage, comparator 52 fires a one-shot multi-vibrator 60. One-shot multi-vibrator 60 then triggers a flip-flop 64 which, via modulator driver 72, signals modulator 70 to prevent laser light beam 14 from reaching beam splitter 15.

Modulator 70 preferably comprises an electro-optical modulator. The exposure of a pixel is therefore determined by the measured time-light integral of an illuminating laser light beam, and is independent of fluctuations in laser output intensity.

A reset and open command subsystem 87 operates to reset integrator 44 using reset integrator pulse 89, and provides an open shutter command 108. Alternate methods for controlling reset and open command subsystem 87 are feasible, with further details relating to selected embodiments disclosed below in relation to FIGS. 3, 4, 6, and 7.

Use of scanning system 10 provides an illuminating spot of laser light which is switched on and off for each pixel. The length of time interval in which the light is turned on is dependent upon the laser light intensity since the required time-light intensity integral is reached more quickly if the intensity is high. Therefore, the ratio of the intervals during which the light is off rather than on will be made higher with greater light intensity. A high ratio means that the spot is on for a small percentage of time, and therefore it moves only a short distance across photoconductive plate 20 during exposure of a pixel. This results in improved modulation transfer function of system 10 because the effective size of each pixel in the scanning direction is only slightly greater than the spot diameter. In contrast, with a continuously illuminating beam, the aperture length is the sum of two adjacent spots.

Figure 2:
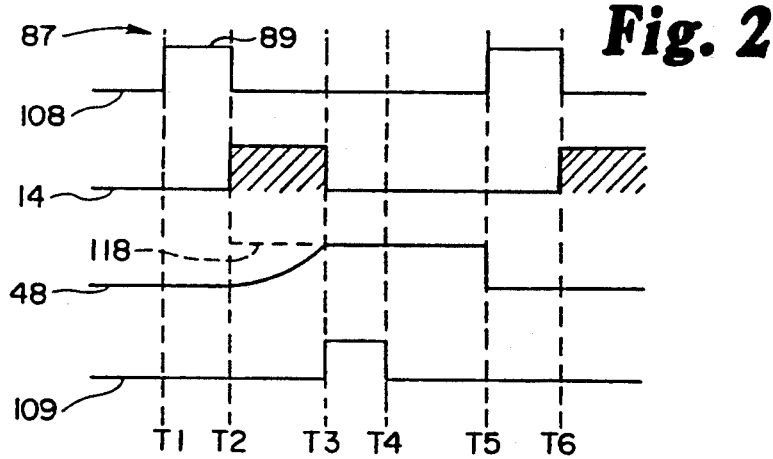
FIG. 2 is a simplified timing diagram relating to the system of FIG. 1.

FIG. 2 is a partial timing diagram relating to the operation of reset and open command subsystem 87. Open command 108 responds to a reset integrator pulse 89 commencing at time T1. Reset integrator pulse 89 resets time-light integrator 44 which permits shutter opening at time T2. Light beam 14 is permitted to pass modulator 70 starting at time T2. Time T2 is therefore the initiation time of first light beam 16 illuminating surface 18, and of second light beam 24 traveling to integrator 44. Integrator output voltage 48 increases after time T2 up to a pre-set voltage output indicated at time T3. When output voltage 48 of integrator 44 reaches the pre-set threshold level 118 of voltage comparator 52, depicted at time T3, then a shutter close pulse 109 is initiated by one shot multivibrator 60 so that light beam 14 passage to beam splitter 15 is prevented until the next cycle.

Figure 3:
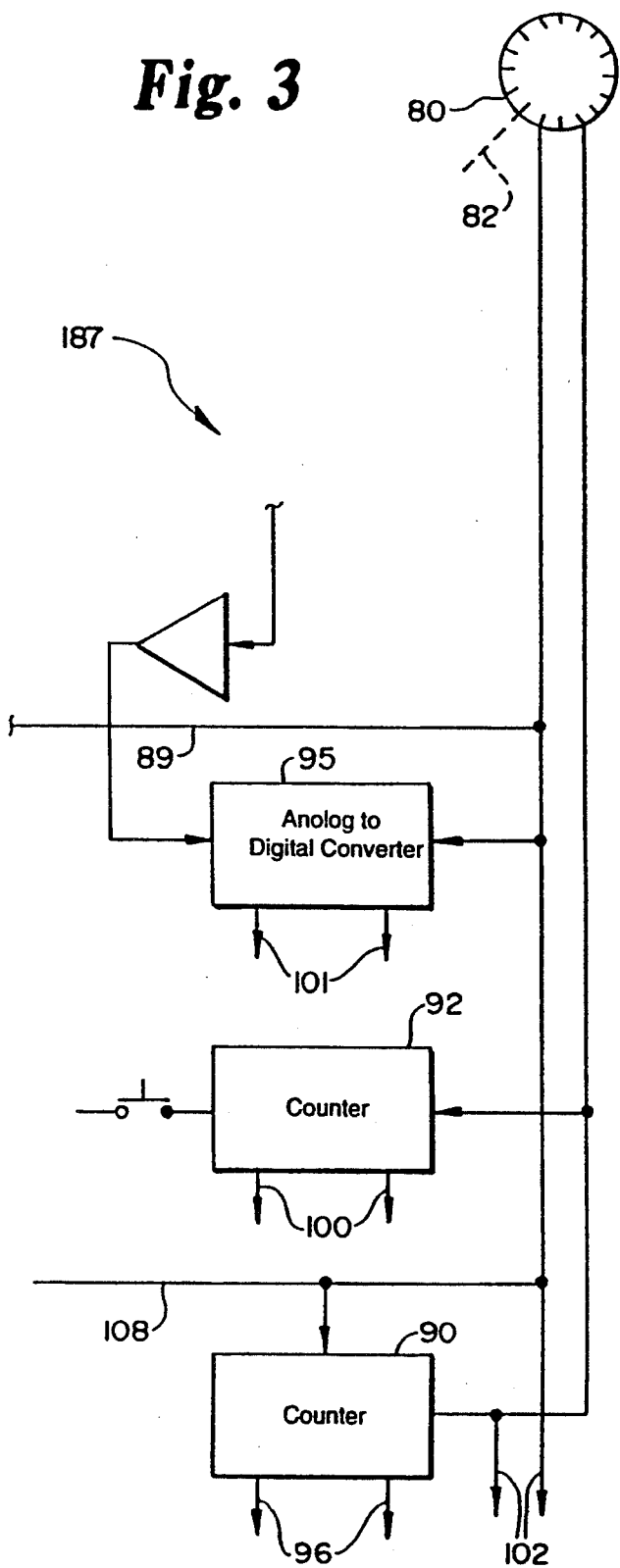
FIG. 3 is a block diagram of a pulse and timing subsystem for use with the scanning system of FIG. 1.
Figure 4:
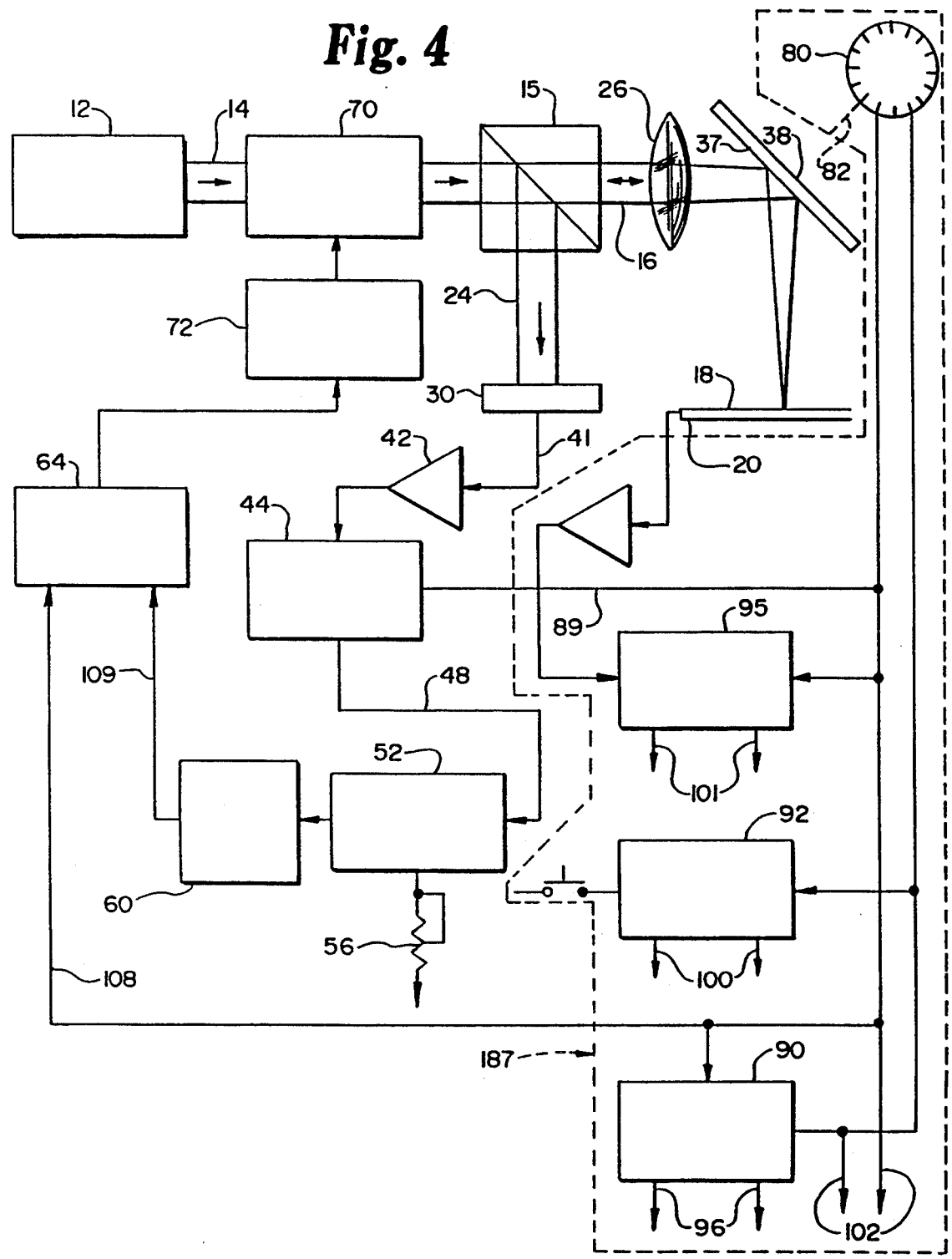
FIG. 4 is a combined block diagram of one embodiment of a scanning system also showing the pulse and timing subsystem of FIG. 3.

FIG. 3 schematically depicts one embodiment of a pulse and timing subsystem 187 associated with reset and open command subsystem 87. FIG. 4 is a combined diagram of the subsystem embodiment of FIG. 3 and the system diagram of FIG. 1. Pulse and timing subsystem 187 preferably comprises a pulse generator 80 which provides a plurality of pulses 82 which are generated by motion of scanner mechanism 38, shown in FIG. 1. Each pulse 82, combined with open shutter command 108, permits modulator 70 to allow exposure of the next pixel on a photoconductive plate. The location of pixels on photoconductive plate 20 are established by the string of pulses which are generated by scanner mechanism 38 and pulse generator 80. The embodiments of FIGS. 3 and 4 are suitable for scanning a photoconductive plate which has no distinguishable optical surface features. The pulse string contains pixels adjacent to each other at a distance equal to the diameter of the illuminating spot of laser light on surface 18 of photoconductive plate 20, to achieve high definition dissection of the image.

As illustrated in FIG. 3, pulse generator 80 comprises one component of pulse and timing subsystem 187. In addition to pulse generator 80, counters 90, 92, are provided for controlling the pulses per scan, pulse initiation at start or end of scan, and pulse reset related to manual start of scanner mechanism 38. Analog to digital converter 95 is provided with signal paths 101 for pixel gray scale functions. Also, signal paths 96 provide address connections to pixels while signal paths 100 provide address connection for lines. Computer synchronization is connected via signal paths 102. Optimum pulse generation rates may vary. A preferred system rate for the system illustrated in FIGS. 1–4 comprises a horizontal pixel density in the order of 250 pixels per linear inch (about 98 pixels/cm).

Figure 5:
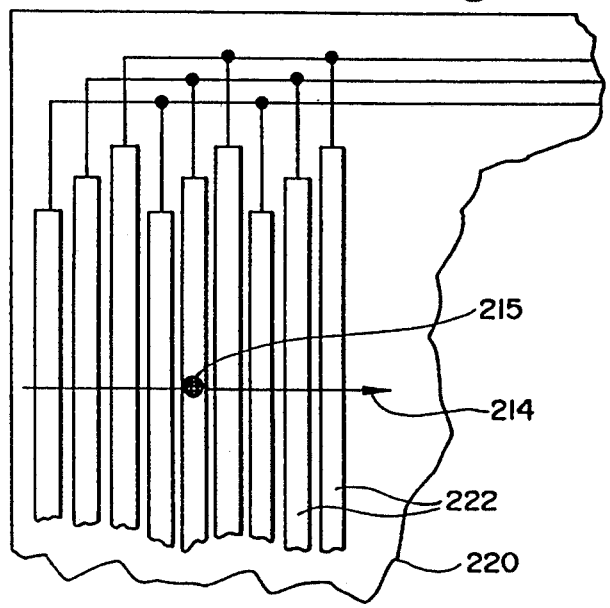
FIG. 5 is a schematic plan view of a plurality of electrodes forming conductive lines on a photoconductive plate with a scanning laser spot moving in a path across the electrodes.

FIG. 5 depicts an alternate embodiment photoconductive plate 220 which has surface features comprising a conductive coating in the form of serrations or a similar pattern of conductive lines. The serrations or lines are preferably arranged at a right angle to the direction of beam scanning. The pattern features of photoconductive plate 220 facilitate more rapid scanning, and also allow the plate to be scanned simultaneously by multiple laser light beams at different locations on the plate. In this embodiment, however, light beam 214 is activated when the illuminating spot 215 crosses the center line of each conductive line 222. Although the pattern of conductive lines on the surface of a plate 220 may vary, it is each particular pattern which determines the scanning format of the plate. Each conductive line 222 may be made of a thin film of gold or similar reflective material, which is substantially transmissive but which reflects a small percentage of infrared light. Accordingly, the intensity of reflected light increases as a spot crosses onto each conductive line and as the conductive surface area reflecting the light increases within spot 215. With this kind of x-ray plate arrangement, it is possible to utilize an infrared laser diode and an additional beam splitter configuration to illuminate plate 220 with an infrared spot having congruency with a blue/green laser spot.

Figure 6:
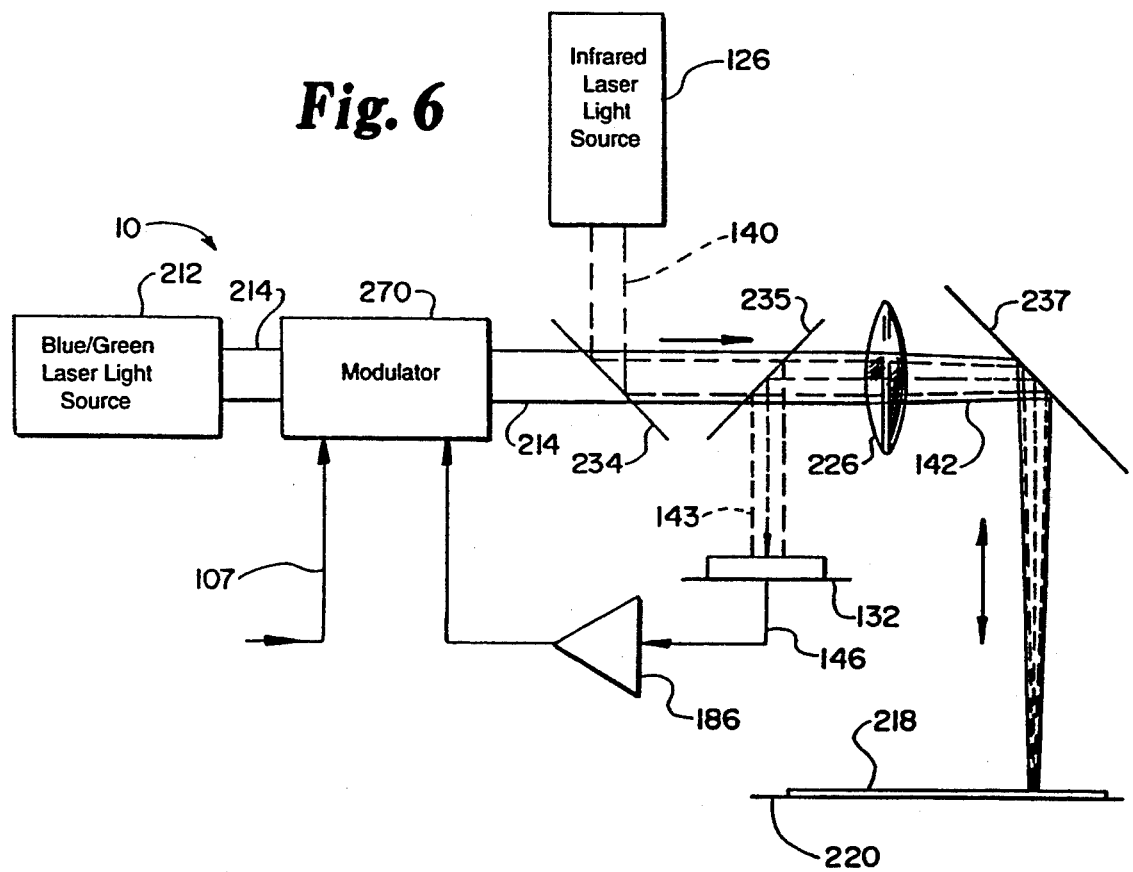
FIG. 6 is a block diagram of a scanning system in which a scanning laser spot is synchronized with preformatted surface features on a photoconductive plate.
Figure 7:
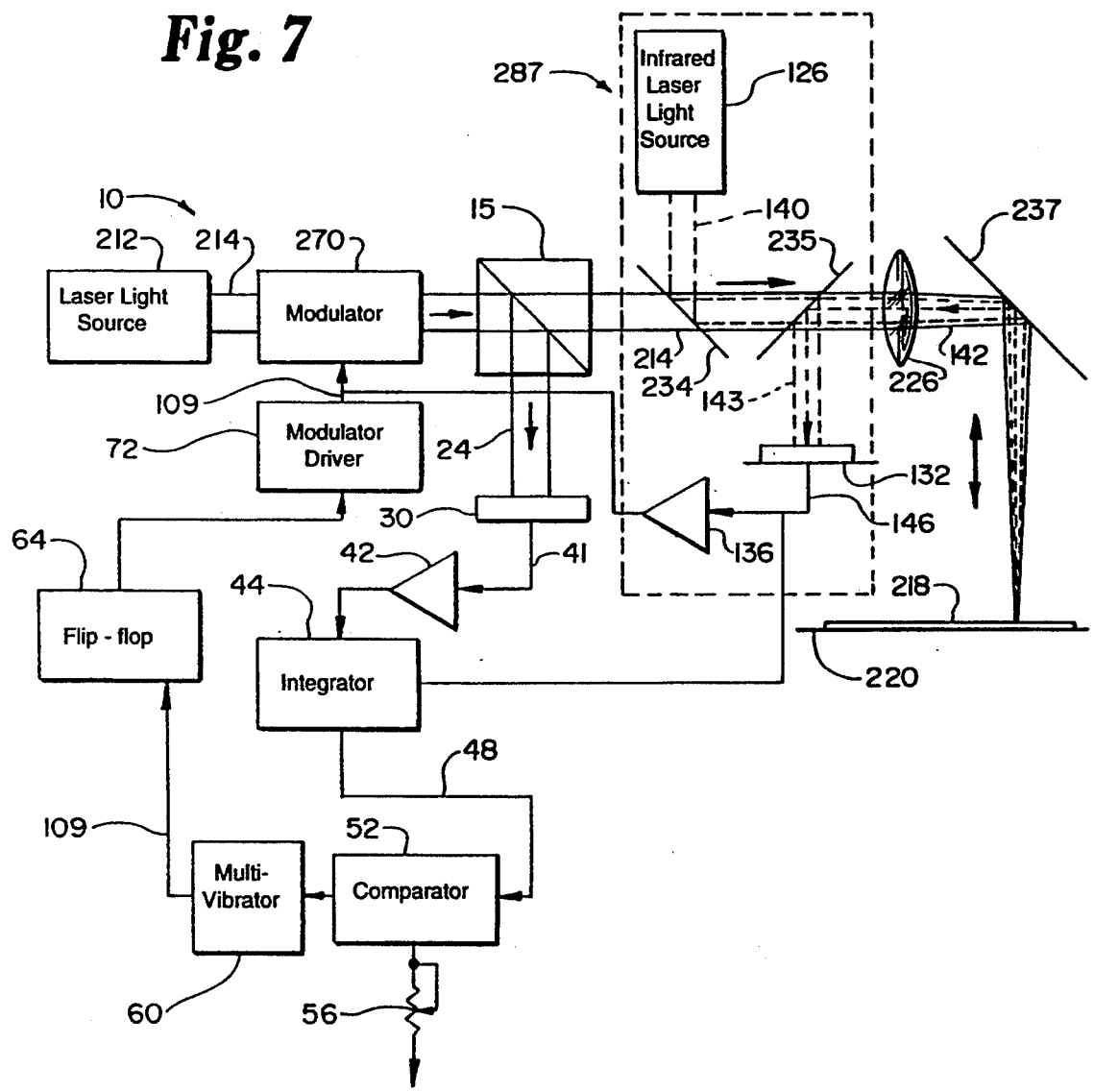
FIG. 7 is a combined block diagram of a preferred embodiment scanning system.

FIG. 6 is a partial schematic diagram of another embodiment of scanning system 10. FIG. 6 particularly shows an embodiment of reset and open command subsystem 87 adapted for use as an infrared sensing and control subsystem 287 for scanning system 10. The configuration of FIG. 6 is particularly useful with a plate 220 having detectable optical surface features. Reference to FIGS. 5 and 7 is helpful in understanding the subsystem embodiment of FIG. 6. A preferred laser light source is a blue/green laser light source 212 with an output blue/green laser light beam 214. During periods of active exposure of light beam 214 onto plate surface 218, electro-optical modulator 270 is configured in an open position. In this position, light beam 214 passes through modulator 270 and through beam splitters including beam splitters 234, 235. Light beam 214 then passes through focusing objective lens 226 before illuminating mirror 237 and surface 218. Holographic means or acousto-optic scanning means may be used in place of mirror 237.

In the embodiment of FIG. 6, infrared sensing and control subsystem 287 comprises infrared laser light source 126, beam splitters 234, 235, infrared detector 132, signal amplifier 136, and interconnecting signal lines. In operation, infrared laser light source 126 comprises an infrared laser diode suitable for generating an infrared laser light beam 140 for reflection and re-direction by beam splitters 234, 235 to provide an incident infrared laser light beam 142 to plate surface 218. Light beam 142 impacts surface 218 substantially congruent with blue/green laser light beam 214, with the latter functioning as a signal detection spot. A reflected infrared laser light beam 143 is also then produced. The long wavelength of the infrared portion of the illuminating light spot 215 does not effect the photo-activity of plate 220, but the reflected infrared light can be used to open modulator 270 and to illuminate a conductive line 222 with the scanning blue/green laser light beam 214.

Infrared detector 132 receives reflected infrared laser light beam 143, and comprises means for comparing the varying infrared reflection with an expected value equivalent to the expected reflectance when the infrared laser light beam 140 is centered on a reflective conductive line 222. When infrared detector 132 senses a centering reflectance level, then modulator open signal 146 is sent via amplifier 136 to open modulator 270 and permit passage of blue/green laser light beam 214 to surface 218 of plate 220. In this manner, the scanning system embodiment of FIGS. 6 and 7 provides a self-clocking means for controlling the scanning laser light on the surface of an x-ray plate. In addition, in contrast with the embodiment of FIG. 2, infrared sensing and control subsystem 287 does not need to generate complex timing pulses in order to open modulator 270. Since the diameter of illuminating spots for both the infrared laser light beam and the blue/green laser light beam are both typically 100 micrometers, obtaining and maintaining congruency is not difficult.

The subsystem embodiments of FIGS. 6 and 7 command modulator 270 to a closed position in the manner disclosed and described in relation to FIG. 1 and FIG. 2. Blue/green laser light beam 214 is deactivated by time-light integrator 44 when pre-set voltage 118 is reached by voltage output 48 and a close shutter signal 109 is sent to modulator 270.

Both of the embodiments of scanning system 10 that are disclosed for use with different types of photoconductive plates utilize the novel time-light intensity integrator function of this invention to minimize undesired laser noise and to improve the modulation transfer function of the system. The embodiments of the subsystems relating to pulse generation and to infrared sensing and control each interact with the remainder of scanning system 10 to control the intensity of light contacting photoconductive plates by controlling the duration and location of a scanning spot of light. The time-light integration method of ensuring substantially identical exposure of each pixel regardless of variations in the steady state or instantaneous power output of the laser light source is a principal feature of this invention. However, the invention also relates to the method of synchronizing the activation of the light source with both a formatted pattern and a non-formatted pattern on a surface of a photoconductive plate. Improvement of modulation transfer function is provided due to the limited movement of the photoactive spot during the short exposure times of pixels. This movement limitation is achieved by pulsing the laser light beams rather than by utilizing a continuous illumination light beam system.

What is claimed is:

1. A method for reducing the effects of laser noise and for improving modulation transfer function in scanning a photoconductive surface with a spot of light, comprising the steps of:
   a) providing a laser light source for directing a first light beam onto a photoconductive surface and for directing a second light beam to a photodetector;
   b) generating, using the photodetector, a current which is proportional to the instantaneous light intensity of the first light beam;
   c) applying the generated current to an integrator to produce an output voltage proportional to the time-light intensity integral of the first light beam;
   d) feeding the output voltage to a voltage comparator to compare the output voltage with a pre-set voltage to create an output signal; and
   e) using the output signal to control a modulator so that when the value of preset voltage in the comparator is exceeded the modulator prevents substantially all of the transmission of the light past the modulator;
   in which the first light beam and the second light beam have different wavelengths.

2. A method for reducing the effects of laser noise and for improving modulation transfer function in scanning a photoconductive surface with a spot of light, comprising the steps of:
   a) providing a laser light source for directing a first light beam onto a photoconductive surface and for directing a second light beam to a photodetector;
   b) generating, using the photodetector, a current which is proportional to the instantaneous light intensity of the first light beam;
   c) applying the generated current to an integrator to produce an output voltage proportional to the time-light intensity integral of the first light beam;
   d) feeding the output voltage to a voltage comparator to compare the output voltage with a pre-set voltage to create an output signal; and
   e) using the output signal to control a modulator so that when the value of preset voltage in the comparator is exceeded the modulator prevents substantially all of the transmission of the light past the modulator;
   in which the first light beam is a blue-green laser and the second light beam is an infrared laser.

3. A method for reducing the effects of laser noise and for improving modulation transfer function in scanning a photoconductive surface with a spot of light, comprising the steps of:
   a) providing a laser light source for directing a first light beam onto a photoconductive surface and for directing a second light beam to a photodetector;
   b) generating, using the photodetector, a current which is proportional to the instantaneous light intensity of the first light beam;
   c) applying the generated current to an integrator to produce an output voltage proportional to the time-light intensity integral of the first light beam;
   d) feeding the output voltage to a voltage comparator to compare the output voltage with a pre-set voltage to create an output signal; and
   e) using the output signal to control a modulator so that when the value of preset voltage in the comparator is exceeded the modulator prevents substantially all of the transmission of the light past the modulator;
   in which one of the light beams has a wavelength at which the photoconductive surface is not photoconductive.

4. A system for reducing the effects of laser noise and for improving modulation transfer function in scanning a photoconductive surface with a spot of light, comprising:
- a) a light source for directing a first light beam onto a photoconductive surface and for directing a second light beam to a photodetector;
- b) a photodetector to generate a current which is proportional to the instantaneous light intensity of the first light beam;
- c) an integrator which receives the current from the photodetector and which produces an output voltage proportional to the time-light intensity integral of the first light beam;
- d) comparator means for comparing the output voltage with a pre-set voltage to create an output signal;
- e) a modulator controlled by the comparator means output signal so that when the value of pre-set voltage in the comparator is exceeded the modulator prevents substantially all of the transmission of the light past the modulator;

in which the first light beam and the second light beam have different wavelengths.

5. A system for reducing the effects of laser noise and for improving modulation transfer function in scanning a photoconductive surface with a spot of light, comprising:
- a) a light source for directing a first light beam onto a photoconductive surface and for directing a second light beam to a photodetector;
- b) a photodetector to generate a current which is proportional to the instantaneous light intensity of the first light beam;
- c) an integrator which receives the current from the photodetector and which produces an output voltage proportional to the time-light intensity integral of the first light beam;
- d) comparator means for comparing the output voltage with a pre-set voltage to create an output signal;
- e) a modulator controlled by the comparator means output signal so that when the value of pre-set voltage in the comparator is exceeded the modulator prevents substantially all of the transmission of the light past the modulator;

in which the first light beam is a blue-green laser and the second light beam is an infrared laser.

* * * * *